(12) United States Patent
Kalfoglou

(10) Patent No.: US 6,186,231 B1
(45) Date of Patent: Feb. 13, 2001

(54) CONFORMANCE IMPROVEMENT IN HYDROCARBON BEARING UNDERGROUND STRATA USING LIGNOSULFONATE-ACRYLIC ACID GRAFT COPOLYMER GELS

(75) Inventor: George Kalfoglou, Houston, TX (US)

(73) Assignee: Texaco Inc., White Plains, NY (US)

( * ) Notice: Under 35 U.S.C. 154(b), the term of this patent shall be extended for 0 days.

(21) Appl. No.: 09/197,265

(22) Filed: Nov. 20, 1998

(51) Int. Cl.$^7$ .................................................. E21B 33/138
(52) U.S. Cl. .......................... 166/270; 166/295; 166/300; 405/264; 507/207; 507/224; 507/903; 523/130
(58) Field of Search ...................... 166/252.5, 270, 166/294, 295, 300; 405/264; 507/207, 224, 259, 903; 523/130

(56) References Cited

U.S. PATENT DOCUMENTS

| | | | |
|---|---|---|---|
| 2,874,545 | * 2/1959 | Twining | 507/207 |
| 3,053,675 | * 9/1962 | Rehmar et al. | 166/294 X |
| 3,882,940 | 5/1975 | Carlin | 166/273 |
| 3,897,827 | 8/1975 | Felber et al. | 166/270 |
| 3,985,659 | 10/1976 | Felicetta et al. | |
| 4,074,757 | 2/1978 | Felber et al. | 166/261 |
| 4,110,231 | 8/1978 | Swanson. | |
| 4,133,385 | 1/1979 | Kalfoglou | 166/273 |
| 4,172,497 | 10/1979 | Kalfoglou | 166/273 |
| 4,172,498 | 10/1979 | Kalfoglou | 166/273 |
| 4,196,777 | 4/1980 | Kalfoglou | 166/273 |
| 4,235,290 | 11/1980 | Kalfoglou | 166/273 |
| 4,236,579 | 12/1980 | Kalfoglou | 166/274 |
| 4,240,505 | * 12/1980 | Swanson | 507/207 X |
| 4,249,606 | 2/1981 | Kalfoglou | 166/273 |
| 4,257,813 | 3/1981 | Lawrence et al. | |
| 4,267,886 | 5/1981 | Kalfoglou | 166/273 |
| 4,269,270 | 5/1981 | Kalfoglou | 166/273 |
| 4,275,789 | 6/1981 | Lawrence et al. | 166/294 |
| 4,276,077 | 6/1981 | Zaslavsky et al. | |
| 4,322,301 | 3/1982 | Blackmore. | |
| 4,344,487 | 8/1982 | Kalfoglou | 166/274 |
| 4,374,738 | 2/1983 | Kelley. | |
| 4,384,997 | 5/1983 | Detroit. | |
| 4,387,205 | 6/1983 | Zaslavsky et al. | 527/400 |
| 4,412,028 | 10/1983 | Lundberg et al. | 524/364 |
| 4,428,429 | 1/1984 | Felber et al. | 166/294 |
| 4,479,542 | 10/1984 | Warchol et al. | 166/273 |
| 4,494,606 | 1/1985 | Sydansk | 166/295 |
| 4,498,539 | 2/1985 | Bruning | 166/294 |
| 4,503,912 | 3/1985 | Norton | 166/295 |
| 4,521,578 | 6/1985 | Chen et al. | 526/288 |
| 4,561,502 | 12/1985 | Norton et al. | 166/274 |
| 4,579,667 | 4/1986 | Echt et al. . | |
| 4,676,317 | 6/1987 | Fry et al. | 166/293 |
| 4,683,949 | * 8/1987 | Sydansk et al. | 166/270 |
| 4,703,797 | 11/1987 | Djabbarah | 166/252 |
| 4,721,161 | 1/1988 | Richardson et al. | 166/295 |
| 4,836,940 | 6/1989 | Alexander. | |
| 4,871,825 | 10/1989 | Lin | 527/400 |
| 4,891,415 | 1/1990 | Lin et al. | 527/400 |
| 5,009,268 | 4/1991 | Kalfoglou | 166/274 |
| 5,228,524 | 7/1993 | Johnson et al. | 175/72 |
| 5,251,698 | 10/1993 | Kalfoglou et al. | 166/274 |
| 5,292,367 | 3/1994 | Bloys et al. | 106/802 |
| 5,295,540 | 3/1994 | Djabbarah et al. | 166/272 |
| 5,339,903 | 8/1994 | Eoff et al. | 166/293 |
| 5,360,787 | 11/1994 | Bloys et al. | 507/124 |
| 5,377,759 | 1/1995 | Surles | 166/295 |
| 5,423,380 | 6/1995 | Johnston et al. | 166/295 |
| 5,513,705 | 5/1996 | Dkabbaraj et al. | 166/263 |
| 5,673,753 | 10/1997 | Hale et al. | 166/293 |

* cited by examiner

*Primary Examiner*—George Suchfield
(74) *Attorney, Agent, or Firm*—Morris N. Reinisch; Howrey Simon Arnold & White

(57) ABSTRACT

A method for reducing the permeability of a region of an underground formation by injecting a gelant solution that forms a stable gel into the region is disclosed. The gelant solution includes an aqueous solvent, about 2% to about 16% by weight of a lignosulfonate-acrylic acid graft copolymer and a sufficient concentration of a crosslinking agent to crosslink the copolymer. The lignosulfonate-acrylic acid copolymer used in the invention has an acrylic acid content of about 10% to about 50% by weight and the crosslinking agent is a complex of one or more positively charged chromium (III) species and one or more negatively charged carboxylate species. Preferably, the chromium (III) species used in the invention has a concentration of about 0.1% to about 8.0% by weight. In one preferred embodiment, the carboxylate species of the crosslinker may be selected from formate, acetate, propionate, lactate, oxalate and malonate. In another preferred embodiment the crosslinker may further comprise one or more species selected from hydroxide and oxygen.

23 Claims, No Drawings

CONFORMANCE IMPROVEMENT IN HYDROCARBON BEARING UNDERGROUND STRATA USING LIGNOSULFONATE-ACRYLIC ACID GRAFT COPOLYMER GELS

BACKGROUND OF THE INVENTION

This invention relates to a method of injecting gel-forming chemicals into one or more relatively high permeability regions of an underground hydrocarbon bearing formation in order to reduce the permeability of these regions. This invention may therefore be used as a method of improving areal and vertical conformance and flow profiles at or away from a production and/or injection wellbore for the purpose of increasing hydrocarbon recovery.

Poor vertical conformance and excessive water production are problems encountered in secondary oil recovery processes in heterogeneous formations with high permeability contrast. This leads to poor recovery efficiencies by bypassing large concentrations of hydrocarbons, and the uneconomical production of high water-oil ratios fluids from producing wells. Most methods to improve conformance involve the injection of a chemical solution into the formation which forms a gel in high permeability regions and thereby lowers permeability.

A number of gel systems have been described over the years for improving conformance in subterranean hydrocarbon bearing formations. One approach commonly used for conformance improvement is injection of polyacrylamide based gels into the wellbore. Polyacrylamide gels are useful over a certain range of temperatures but at higher temperatures they undergo thermal hydrolysis which leads to $Ca^{2+}$ and $Mg^{2+}$ ion intolerance and/or gel degradation. Gel systems with increased stability, especially in the presence of high temperatures and hard water, were found to be desirable.

To address the need for conformance improvement of high temperature subterranean regions, other types of gel treatment methods were developed that make use of lignosulfonates and sulfonated lignins. These compounds have frequently been proposed to be used in permeability reducing processes due to their inexpensive cost and favorable chemical structure. The sulfonate groups of lignosulfonates do not complex readily with salts and therefore lignosulfonate gels are more resistant to precipitation due to hardness and high temperature than other types of gels. The disadvantage to this system is that the gelant solutions containing lignosulfonate are only set by high formation temperatures. U.S. Pat. No. 4,074,757 describes injecting lignosulfonate and water in the absence of other gelation promoters in order to achieve high temperature plugging. To achieve gelation at lower temperatures, lignosulfonates have been mixed with an activator comprised of dichromate (i.e. chromium (VI)) and an alkali metal or alkaline earth salt. U.S. Pat. No. 3,896,827 describes a lignosulfonate gel formed by injecting a lignosulfonate solution with a mixed activator comprising a dichromate and an alkali metal or alkaline earth salt. However, the use of dichromate is not environmentally preferred due to its high toxicity and carcinogenicity. Other variations of lignosulfonate based gelants have been described. U.S. Pat. Nos. 4,257,813 and 4,275,789 teach methods using silicate activated lignosulfonate gels. U.S. Pat. No. 4,428,429 discloses a process where a lignin solution gels in the formation. A profile control process is described in U.S. Pat. No. 4,110,231 where lignosulfonate and carboxymethyl cellulose comprise the treatment system.

Lignosulfonate-acrylic acid copolymers have been proposed for use as gels for conformance improvement. U.S. Pat. No. 4,721,161 discloses the use of lignosulfonate and acrylic acid which are reacted in situ using a catalyst and low pH to copolymerize the lignosulfonate and acrylic acid and form a gel to decrease permeability around a wellbore. However, due to the fast reaction rates involved in this method, the use of this system has been found to be undesirable in most instances. The fast reaction rates prevent the use of this method where deep penetration is required, such as injection well treatments for profile modification. In addition to limiting the amount of gel that can be used to treat the formation, the fast reaction rates of this gel system also necessitate the mixing of the gel components and catalyst within the wellbore. The use of gel treatment methods requiring in situ mixing of gel components have proven unsatisfactory in the art due to the difficulty in achieving complete mixing. Incomplete mixing in situ leads to uncontrolled and non-uniform gel placement in the underground formation.

The need therefore exists for a gel treatment system for conformance improvement that is stable over a wider range of temperatures and in the presence of hard water, and that can be delivered efficiently and controllably to the underground region in need of treatment.

These and other features of the present invention are more fully set forth in the following description of illustrative embodiments of the invention.

SUMMARY OF THE INVENTION

The disclosed invention is a method for reducing the permeability of a region of an underground formation by injecting a gelant solution that forms a stable gel into the region. The gelant solution includes an aqueous solvent, about 2% to about 16% by weight of a lignosulfonate-acrylic acid graft copolymer and a sufficient concentration of a crosslinking agent to crosslink the copolymer. The lignosulfonate-acrylic acid copolymer used in the invention has an acrylic acid content of about 10% to about 50% by weight and the crosslinking agent is a complex of one or more positively charged chromium (III) species and one or more negatively charged carboxylate species. Preferably, the chromium (III) species used in the invention has a concentration of about 0.1% to about 8.0% by weight. In one preferred embodiment, the carboxylate species of the crosslinker may be selected from formate, acetate, propionate, lactate, oxalate and malonate. In another preferred embodiment the crosslinker may further comprise one or more species selected from hydroxide and oxygen.

A particular advantage to the disclosed invention is that brine may be used as the aqueous solvent of the gelant solution. Further, in one embodiment, the gelant solution of the disclosed invention may be prepared prior to injection into the subterranean region and does not require mixing in situ. In preferred embodiments the gelant solution may be prepared at the surface either in a batch process or on the fly.

Finally, the gelant solution of the invention may be tailored to the treatment needs of a high permeability region of an underground formation by a process of determining the characteristics of the high permeability region, providing a gelant solution of the disclosed invention having predetermined gel properties appropriate to the region to be treated, and injecting the gelant solution into the region.

DETAILED DESCRIPTION

The disclosed invention is carried out by injecting a gelant solution into a region of an underground formation in order to reduce its permeability. The gelant solution includes about 2% to about 16% by weight of a lignosulfonate-acrylic acid graft copolymer and a sufficient concentration of a crosslinking agent to crosslink the copolymer dissolved in an aqueous solvent. The lignosulfonate-acrylic acid graft copolymer used in the gelant solution should have an acrylic acid content of about 10% to about 50% by weight. The crosslinking agent is a complex of one or more positively charged chromium (III) species and one or more negatively charged carboxylate species. Lignosulfonate-acrylic acid graft copolymers form stable gels over a wide range of temperatures and under harsh salinity conditions when crosslinked with chromium (III) ions. These gels have the advantage of being thermally stable due to the presence of sulfonate groups on the graft copolymer. Chromium (III) is also less toxic than dichromate and therefore less environmentally hazardous when used in underground gel treatment systems.

The amount of lignosulfonate-acrylic acid graft copolymer in the gelant solution will be one factor in the amount of time required for the gelant to form a stable gel. The higher the copolymer concentration of the gelant solution the faster the gelant solution will tend to form a gel. Gelant solutions comprising about 2% to about 16% lignosulfonate-acrylic acid graft copolymer are preferred. Gelant solutions at these concentrations readily formed gels under laboratory conditions. However, due to dilution of the gelant solution in the underground formation, gelant solutions containing lower concentrations of lignosulfonate-acrylic acid graft copolymer may form gels having insufficient gel strength. Therefore gelant solutions comprising about 5% to about 16% lignosulfonate-acrylic acid graft copolymer are preferred, and a concentration of about 8% to about 12% graft copolymer is most preferred.

The lignosulfonate-acrylic acid graft copolymer used in the invention should comprise about 10% to about 50% by weight acrylic acid monomer. Higher acrylate content in the graft copolymer raises the cost of the polymer but also reduces the total graft copolymer concentration required to achieve gelation. Lower acrylate content in the graft copolymer may be useful in higher temperature applications, but generally an acrylate content of about 15% by weight to about 50% will be preferred. The average molecular weight of the lignosulfonate used is in the range of about 10,000 to about 100,000. Lower molecular weight graft copolymer will tend to require higher copolymer concentrations to produce gels.

The gelant solution of the invention also includes a sufficient concentration of a crosslinking agent to crosslink the graft copolymer to a stable gel. Preferred crosslinker concentrations in the gelant solution may vary from about 0.1% to about 8%. The crosslinking agent is a complex of one or more positively charged chromium (III) species and one or more negatively charged carboxylate species. The complex may contain one or more hydroxide species or one or more oxygen species. The oxygen or hydroxide species act as bridging ligands in chelates where there is more than one chromium (III) ion. Inorganic mono and/or divalent ions may also exist to balance the electrical charge of the complex. The advantage of using a chromium carboxylate complex over a simple chromium salt is the slowing down of the crosslinking reaction between the complexing agent and the acrylate groups on the copolymer due to the competition by the additional carboxylate groups in the crosslinker complex. The slowed crosslinking reaction is believed to extend the gel time and thus allows sufficient time to place large gel volumes in the formation. One skilled in the art should expect this effect to extend to other anionic chemical groups that might be used in the crosslinking agent if those groups are capable of competing with the interaction between chromium (III) and the acrylate groups of the copolymer.

The disclosed process provides advantages over some other gelation processes known in the art. One can formulate gel systems with wide gel properties, such as gel times, gel strengths and gel stabilities, because in addition to varying the copolymer and crosslinker concentrations one can use graft copolymers of varying acrylate content to alter the crosslinking reaction. This allows one to obtain gels with the required predetermined properties to effectively treat high permeability regions over a wider range of temperatures than previously described gel treatment systems. Additionally, the gels formed by the present invention will exhibit increased gel stability in the presence of hard water and/or high temperatures than polyacrylamide-based gel systems.

The properties exhibited by the gels formed by the present invention can be evaluated in the laboratory in order to tailor the gel's characteristics to a range of underground environments. The gel time is the time required for the crosslinking of the graft copolymer to produce a three-dimensional network. This is determined visually by observing the flowing characteristics of the gel systems in tubes or ampules. Gel strength of a gel is defined as the coherence of the three-dimensional network or resistance to deformation by external forces. Gel strength can qualitatively be evaluated in tubes or ampules. It can also be assessed by measuring the pressure drop in cores or sandpacks which have been saturated with the gel system and shut in to achieve full gel strength. Gel stability can be either thermal or chemical and has to do with the ability of a gel to withstand elevated temperatures, which can result in gel degradation, or to resist syneresis and/or precipitation, which can detract from the gel structure and performance.

In order to accurately choose a copolymer or crosslinker concentration based on laboratory observations of gel properties, the practitioner must also take certain real world variables into account besides the formation temperature. These include the level of dilution of the gelant solution that would be expected to take place within the underground formation during the placement of the gel, and the presence of salts in either the gelant solution solvent and/or any diluent expected to be present in the underground region being treated. It is a particular advantage of the present invention that brine may be used to prepare the gelant solution or may be present as a diluent in the formation. The brine present in the injected gelant solution of the invention can have a wide range of salinities and hardness due to lignosulfonate moiety's inherent tolerance of high salt content and hardness.

Providing a gel with a predetermined gel time is desirable for several reasons. Excessively rapid gel times prevent the use of a gel system in cases where deep penetration is required and/or when large volumes of gel must be placed in the wellbore. Excessively slow gel times lead to long and costly shut-in times while waiting for the gel to form. Gels will tend to form more rapidly at high temperatures and more slowly at lower temperatures. Based on the temperature of the high permeability region one wishes to treat, a gelant solution of the present invention that has a useful gel time can be chosen. Generally, gels with higher copolymer concentrations or higher crosslinker concentrations will have shorter gel times than those with lower concentrations of either copolymer or crosslinker.

Tailoring the gel strength may also be useful depending on the application of the invention. In general, a certain minimal gel strength will be required. While greater gel strength is desirable, it may be possible to reduce the cost of the gel treatment by using the lowest possible gel strength required to adequately reduce the permeability of a high permeability region. This is because gel strength will tend to increase with increasing copolymer concentration, as will cost.

Greater gel stability will extend the useful lifetime of the treatment to reduce permeability and therefore the greatest possible gel stability will generally be desired. II However, as with gel strength, the gel stability requirement will often be balanced with the desire to use a treatment system that will provide adequate stability for minimal cost. Gel stability will tend to be increased with increasing copolymer concentration. On the other hand, if the diluent contains high levels of $Ca^{+2}$ or $Mg^{+2}$ ions, which could diminish Is the long term stability of gels, the lignosulfonate-graft copolymer should have a high ligynosulfonate/acrylate ratio to resist gel destabilization due to precipitation and help maintain the long-term stability.

Another advantage of the disclosed invention is the ability to inject a complete gelant solution into the high permeability region without mixing of the gelant solution in situ. The gelant solution may therefore be prepared at the surface by mixing lignosulfonate graft copolymer with crosslinker either in a batch process or on the fly. As stated earlier, there are significant disadvantages to in situ mixing of gelant solutions, the main one being the difficulty in obtaining complete and uniform mixing within the underground formation. It is therefore desirable to be able to prepare a complete gelant solution at the surface in order to form a more uniform gel after the gelant solution has been injected into an underground formation.

Yet another advantage of the present invention is that the disclosed gelant solutions have low viscosities because the graft copolymer used is of relatively low molecular weight. Consequently, the gelant is easy to pump and it can more successfully penetrate into the watered out regions of the formation. This allows the gel system of the present invention to produce a gel that can be selectively and efficiently applied to the desired portions of the formation while forming a gel of sufficient strength to effectively plug those portions of the formation once the gel is set. This is desirable because the goal of the gel treatment of many wells is to reduce excess water production without reducing oil production. Low viscosity gelant is also desirable in horizontal well treatments because it will be more evenly placed around the wellbore. Excess water is frequently the result of water channeling through fractures or fingering through high permeability thief zones. These fractures may be natural or induced. Newly drilled wells are frequently hydraulically fractured to stimulate hydrocarbon production. Wells may also be fractured unintentionally during water flooding operations. Fractures and high permeability thief zones are the usual cause of early water breakthrough which leads to excess water production. For best results in the use of gel treatments, the conductivity of the fracture or thief zone must be reduced without affecting the flow paths of movable oil.

During gel placement, a certain amount of "leak off" takes place from the high permeability paths into the rock matrix. Viscous gelants cause larger amounts of "leak off" than low-viscosity gelants. Lower viscosity gelants will therefore tend to produce better application results. Thus successful gel treatment requires gelant placement where permeability reduction is maximized in high permeability watered-out zones while permeability reduction is minimized in low permeability oil-producing zones. Zonal isolation of channels and/or thief zones during application of the gelant is an alternative method for controlling gelant placement, but is too costly to be worthwhile. Therefore, application of low viscosity gelants is the economically preferred method of treatment.

Commonly used polyacrylamide based gelants exhibit viscosities in the range of 20 to 100 cp and higher depending on the polymer molecular weight, concentration and temperature. In comparison, lignosulfonate acrylic acid graft copolymer based gelants have very low viscosities. Under laboratory conditions, the inventor finds that lignosulfonate acrylic acid graft copolymer gelants had viscosities 15 to 60 times lower thaw polyacrylamide based gelants.

Lignosulfonate-acrylic acid graft copolymers crosslinked with chromium (III) ion have utility over a wide temperature range and are more cost effective in comparison to current high polymer concentration gel systems (MARASEAL) and high temperature gel systems (HE Polymer). The graft copolymers cost from 0.15–0.50 $/lb dependent on the amount of acrylic acid grafted on the lignosulfonate. At elevated temperatures the gel systems designed will be less costly than the ones designed for lower temperatures.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

Test tube tests were carried out using unpolymerized and copolymerized lignosulfonates crosslinked with chromium triacetate ($CrAc_3$). The brine used was synthetic seawater (33,700 ppm TDS; 1,700 ppm hardness). The test temperature ranged between 120° F. (49° C.) to 220° F. (105° C.). The lignosulfonate-acrylic acid graft copolymers used were obtained from Georgia-Pacific Corp. and the chromium triacetate was received from McGean-Rohco, Inc. as a 50% chromic acetate solution. The acrylic acid content in the graft copolymers used ranged from zero (Lignosite 100) to 33% (w/w).

TABLE 1

GELATION OF LIGNOSULFONATE-ACRYLIC ACID COPOLYMERS WITH CHROMIUM ACETATE

| Lignosulfonate Graft Copolymer | Acrylate (%) | Crosslinker (%) | Gel Time (hrs) | Gel Strength (%) |
|---|---|---|---|---|
| (Temp.: 120° F.(49° C.); Brine: 33,700 ppm TDS) | | | | |
| 5% Lignosite 100 | 0 | 4 | No gel | 0 |
| 5% E-5080 | 23 | 4 | No gel | 0 |
| 5% Lignosite 100 | 0 | 4 | No gel | 0 |
| 8% E-5080 | 23 | 4 | No gel | 0 |
| 8% E-5085 | 33 | 4 | 60 | 100 |
| 10% E-5085 | 33 | 5 | 40 | 100 |
| (Temp.: 150° F.(66° C.)) | | | | |
| 8% Lignosite 100 | 0 | 4 | No gel | 0 |
| 8% E-5080 | 23 | 4 | No gel | 0 |
| 8% E-5085 | 33 | 4 | 12 | 100 |

TABLE 1-continued

GELATION OF LIGNOSULFONATE-ACRYLIC ACID COPOLYMERS WITH CHROMIUM ACETATE

| Lignosulfonate Graft Copolymer | Acrylate (%) | Crosslinker (%) | Gel Time (hrs) | Gel Strength (%) |
|---|---|---|---|---|
| (Temp.: 200° F.(93° C.)) | | | | |
| 8% Lignosite 100 | 0 | 4 | No gel | 0 |
| 5% E-5080 | 23 | 4 | 120 | 100 |
| 8% E-5080 | 23 | 4 | 16 | 100 |
| 8% E-5085 | 33 | 4 | 8 | 100 |
| (Temp.: 220° F.(105° C.)) | | | | |
| 8% Lignosite 100 | 0 | 4 | No gel | 0 |
| 8% E-5080 | 23 | 4 | 5 | 100 |
| 8% E-5085 | 33 | 4 | 1.5 | 100 |

The gelation tests show that the noncopolymerized lignosulfonate did not gel at temperatures from 120° F. (49° C.) to 220° F. (104° C.). On the other hand, the lignosulfonate-acrylic acid graft copolymers did gel over the same temperature range. The higher the acrylate content the shorter the gel time observed for a given temperature. The gels reached 100% gel strength at the end of gelation.

EXAMPLE 2

One advantage of lignosulfonate-acrylic acid graft copolymer based gelants have is that they have low viscosities. Brookfield viscosities of 8% lignosulfonate acrylic acid-graft copolymer (E-5079) solutions in seawater were measured over a temperature range of 77° F. (25° C.) to 203° F. (95° C.).

TABLE 2

VISCOSITIES OF LIGNOSULFONATE-ACRYLIC ACID COPOLYMERS IN SEAWATER
(Conc: 8% w/w/; 33,700 ppm TDS)

| | Viscosity (cp) | | | |
|---|---|---|---|---|
| | 25° C. | 50° C. | 75° C. | 95° C. |
| B-5079 | 1.60 | 1.20 | 0.81 | 0.55 |
| Seawater | 1.04 | 0.81 | 0.68 | 0.61 |

The viscosity of the subject copolymer is 1.60 cp at ambient temperature. This compares very favorably to polyacrylamides since the lignosulfonate copolymer viscosity is about 15 to 60 times lower than the viscosities of polyacrylamides.

EXAMPLE 3

Flow tests were performed to determine how effectively the proposed gelant is placed in a sandpack and the sandpack is later plugged off by the gelled system. The injected fluids used in these experiments were seawater and lignosulfonate copolymer gelants. The sandpacks used contained Ottawa sand packed in steel cylinders 1.7 in ID×5.7 in long. The sandpack permeabilities ranged from 1 to 2 D. The sandpacks were first saturated with seawater at room temperature. The permeability was measured by injecting seawater at a rate of 0.5 ml/min with a Milton Roy chemical pump and measuring the injection pressure.

Gelants were injected at a rate of 0.5 ml/min and the injection pressure was recorded until it reached a maximum level. The injection pressures observed were very low (see Table below) because of the low viscosities of the lignosulfonate copolymer systems in comparison to polyacrylamide gelants which exhibit pressures 10 to 20 times higher. The lower the injection pressure the less penetration into the low permeability oil-producing zones.

FLOW PROPERTIES OF E-5085/Cr ACETATE IN SEAWATER
(33,700 ppm TDS)

| E-5085/Cr Acetate | Temp. ° F.(° C.) | Injection Pressure (psi) | Injection Rate (ml/min) | Pore Vol. Inj. | Backflow (psi) | Residual Resistance Factor |
|---|---|---|---|---|---|---|
| 8%/3% | 160(71) | 3.0 | 1.0 | 9 | 202 | 140 |
| 4%/1.7% | 200(93) | 3.5 | 0.5 | 13 | 60 | 44 |
| 4%/1.4% | 212(100) | 2.0 | 0.5 | 12 | 48 | 37 |

Three lignosulfonate copolymer gel systems were tested at the temperatures of 160° F. (71° C.), 200° F. (93° C.), and 212° F. (100°C.). After 9 to 13 pore volumes injected the sandpacks were shut in and were stored in ovens at test temperatures for 3 days to achieve maximum gelation. The sandpacks were then tested to determine the permeability reducing effectiveness of each gel system. The sandpacks were backflowed by injecting seawater in the opposite direction of the initial injection and measuring the pressure at constant flow rate. The backflow pressures were recorded and the Residual Resistance Factors (RRF—the ratio of pretreatment to post-treatment permeabilities) were calculated. These indicate the plugging effectiveness of the gel systems. It is observed that the higher concentration gel system (8%) exhibited a higher RRF (140) than the lower concentration (4%) systems (RRF~40). This is expected because the higher concentration lignosulfonate copolymer gelant produces stiffer gels which block the backflow more effectively.

The flow studies of lignosulfonate acrylic acid graft copolymers crosslinked with chromium (III) ion show that the gelant can be injected at very low injection pressures in a rock matrix which is a requirement in certain treatments such as minimizing cross flow or horizontal well placement to achieve even distribution above and below the wellbore.

In view of the above disclosure, one of ordinary skill should appreciate that one illustrative embodiment of the present invention includes a method for reducing the permeability of a region of an underground formation. Such an illustrative method may include: injecting a gelant solution into the region, the gelant solution including an aqueous solvent, about 2% to about 16% by weight of a lignosulfonate-acrylic acid graft copolymer and a sufficient concentration of a crosslinking agent to crosslink the copolymer, the copolymer having an acrylic acid content of about 10% to about 50% by weight, and wherein the crosslinking agent may be a complex of one or more positively charged chromium (III) species and one or more negatively charged carboxylate species. The method may be carried out wherein the carboxylate species may be selected from formate, acetate, propionate, lactate, oxalate and malonate, or the method may be carried out in which the crosslinking agent includes one or more species selected from hydroxide and oxygen. In one preferred embodiment, the aqueous solvent may be brine however other aqueous salt containing solution may also be used. It has been found that in one illustrative embodiment, the chromium (III) species may have concentration of about 0.1% to about 8.0% by weight.

Yet another illustrative embodiment of the present invention may include a method for reducing the permeability of a subterranean formation which includes: preparing a gelant solution including an aqueous solvent, about 2% to about 16% by weight of a lignosulfonate-acrylic acid graft copolymer and a sufficient concentration of a crosslinking agent to crosslink the copolymer, the copolymer having an acrylic acid content of about 10% to about 50% by weight, and wherein the crosslinking agent is a complex of one or more positively charged chromium (III) species and one or more negatively charged carboxylate species; injecting the gelant solution into the subterranean formation; and crosslinking the gelant solution to form a crosslinked gel. This illustrative method may be carried out such that the gelant solution is prepared by mixing the lignosulfonate graft copolymer and the crosslinking agent either in a batch process or in a continuous mixing process. The gelant solution may be prepared at the surface by mixing the lignosulfonate graft copolymer and the crosslinking agent either in a batch process or in a continuous mixing process. In one preferred embodiment of the present illustrative embodiment, the carboxylate species is selected from formate, acetate, propionate, lactate, oxalate and malonate. The method may also be carried out wherein the crosslinking agent further includes one or more species selected from hydroxide and oxygen. The aqueous solvent may be a brine solution or it may be an aqueous solution containing salt that functions in the same way as a brine solution. In one preferred embodiment, the chromium (III) species has a concentration of about 0.1% to about 8.0% by weight. The carboxylate species may be selected from formate, acetate, propionate, lactate, oxalate and malonate. The crosslinking agent may further comprise one or more species selected from hydroxide and oxygen.

A further illustrative embodiment may include a method for reducing the permeability of a region of an underground formation. Such a method may include: predetermining the characteristics of the region, providing a gelant solution capable of forming a crosslinked gel within the region, the crosslinked gel having predetermined gel properties, wherein the gelant solution comprises an aqueous solvent, about 2% to about 16% by weight of a lignosulfonate-acrylic acid graft copolymer and a sufficient concentration of a crosslinking agent to crosslink the copolymer, the copolymer having an acrylic acid content of about 10% to about 50% by weight, and wherein the crosslinking agent may be a complex of one or more positively charged chromium (III) species and one or more negatively charged carboxylate species, and injecting the gelant solution into the region. Such a method may be carried out in a manner wherein the carboxylate species is selected from formate, acetate, propionate, lactate, oxalate and malonate. The method may also be carried out wherein the crosslinking agent further comprises one or more species selected from hydroxide and oxygen. As with previous illustrative embodiments, the aqueous solvent may be a brine or it may be any other aqueous salt solution that achieves the same result as a brine solution. It is preferred that the chromium (III) species have a concentration of about 0.1% to about 8.0% by weight.

While the compositions and methods of this invention have been described in terms of preferred embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A method for reducing the permeability of a region of an underground formation, the method comprising:
   injecting a gelant solution into the region, the gelant solution including an aqueous solvent, about 2% to about 16% by weight of a lignosulfonate-acrylic acid graft copolymer and a sufficient concentration of a crosslinking agent to crosslink the copolymer, the copolymer having an acrylic acid content of about 10% to about 50% by weight, and wherein the crosslinking agent is a complex of one or more positively charged chromium (III) species and one or more negatively charged carboxylate species.

2. The method of claim 1 wherein the carboxylate species is selected from the group consisting of formate, acetate, propionate, lactate, oxalate and malonate.

3. The method of claim 1 wherein the crosslinking agent further comprises one or more species selected from the group consisting of hydroxide and oxygen.

4. The method of claim 1 wherein the aqueous solvent is brine.

5. The method of claim 1 wherein the chromium (III) species has a concentration of about 0.1% to about 8.0% by weight.

6. The method of claim 5 wherein the carboxylate species is selected from the group consisting of formate, acetate, propionate, lactate, oxalate and malonate.

7. The method of claim 5 wherein the crosslinking agent further comprises one or more species selected from the group consisting of hydroxide and oxygen.

8. A method for reducing the permeability of a subterranean formation, the method comprising:
   preparing a gelant solution including an aqueous solvent, about 2% to about 16% by weight of a lignosulfonate-acrylic acid graft copolymer and a sufficient concentration of a crosslinking agent to crosslink the copolymer, the copolymer having an acrylic acid content of about 10% to about 50% by weight, and wherein the crosslinking agent is a complex of one or more positively charged chromium (III) species and one or more negatively charged carboxylate species,
   injecting the gelant solution into the subterranean formation, and
   crosslinking the gelant solution to form a crosslinked gel.

9. The method of claim 8 wherein the gelant solution is prepared by mixing the lignosulfonate graft copolymer and the crosslinking agent either in a batch process or in a continuous mixing process.

10. The method of claim 8 wherein the carboxylate species is selected from the group consisting of formate, acetate, propionate, lactate, oxalate and malonate.

11. The method of claim 8 wherein the crosslinking agent further comprises one or more species selected from the group consisting of hydroxide and oxygen.

12. The method of claim 8 wherein the aqueous solvent is brine.

13. The method of claim 8 wherein the chromium (III) species has a concentration of about 0.1% to about 8.0% by weight.

14. The method of claim 13 wherein the gelant solution is prepared at the surface by mixing the lignosulfonate graft copolymer and the crosslinking agent either in a batch process or in a continuous mixing process.

15. The method of claim 13 wherein the carboxylate species is selected from the group consisting of formate, acetate, propionate, lactate, oxalate and malonate.

16. The method of claim 13 wherein the crosslinking agent further comprises one or more species selected from the group consisting of hydroxide and oxygen.

17. A method for reducing the permeability of a region of an underground formation, the method comprising:

predetermining the characteristics of the region, providing a gelant solution capable of forming a crosslinked gel within the region, the crosslinked gel having predetermined gel properties, wherein the gelant solution comprises an aqueous solvent, about 2% to about 16% by weight of a lignosulfonate-acrylic acid graft copolymer and a sufficient concentration of a crosslinking agent to crosslink the copolymer, the copolymer having an acrylic acid content of about 10% to about 50% by weight, and wherein the crosslinking agent is a complex of one or more positively charged chromium (III) species and one or more negatively charged carboxylate species, and injecting the gelant solution into the region.

18. The method of claim 17 wherein the carboxylate species is selected from the group consisting of formate, acetate, propionate, lactate, oxalate and malonate.

19. The method of claim 17 wherein the crosslinking agent further comprises one or more species selected from the group consisting of hydroxide and oxygen.

20. The method of claim 17 wherein the aqueous solvent is brine.

21. The method of claim 17 wherein the chromium (III) species has a concentration of about 0.1% to about 8.0% by weight.

22. The method of claim 21 wherein the carboxylate species is selected from the group consisting of formate, acetate, propionate, lactate, oxalate and malonate.

23. The method of claim 21 wherein the crosslinking agent further comprises one or more species selected from the group consisting of hydroxide and oxygen.

* * * * *

UNITED STATES PATENT AND TRADEMARK OFFICE
CERTIFICATE OF CORRECTION

PATENT NO. : 6,186,231 B1  
DATED : February 13, 2001  
INVENTOR(S) : George Kalfoglou Page 1 of 1

It is certified that error appears in the above-identified patent and that said Letters Patent is hereby corrected as shown below:

Column 5,
Line 17, delete "Is"

Column 7,
Line 55, delete B5079 and insert -- E5079 --

Signed and Sealed this

Seventh Day of August, 2001

Attest:

NICHOLAS P. GODICI
Attesting Officer — Acting Director of the United States Patent and Trademark Office